(12) United States Patent
Calmus

(10) Patent No.: US 10,803,320 B2
(45) Date of Patent: Oct. 13, 2020

(54) METHOD AND SYSTEM FOR FACILITATING TRAY MANAGEMENT

(71) Applicant: City of Eden, LLC, Los Angeles, CA (US)

(72) Inventor: Jonathan Calmus, Los Angeles, CA (US)

(73) Assignee: City of Eden, LLC, Los Angeles, CA (US)

(*) Notice: Subject to any disclaimer, the term of this patent is extended or adjusted under 35 U.S.C. 154(b) by 0 days.

(21) Appl. No.: 16/143,185

(22) Filed: Sep. 26, 2018

(65) Prior Publication Data

US 2019/0095717 A1 Mar. 28, 2019

Related U.S. Application Data

(60) Provisional application No. 62/563,527, filed on Sep. 26, 2017.

(51) Int. Cl.
| | |
|---|---|
| G06K 9/00 | (2006.01) |
| G06Q 50/28 | (2012.01) |
| G08B 21/24 | (2006.01) |
| G01G 19/52 | (2006.01) |
| G08B 25/10 | (2006.01) |
| G01G 19/414 | (2006.01) |

(52) U.S. Cl.
CPC ..... *G06K 9/00718* (2013.01); *G01G 19/4144* (2013.01); *G01G 19/52* (2013.01); *G06K 9/00288* (2013.01); *G06K 9/00771* (2013.01); *G06Q 50/28* (2013.01); *G08B 21/24* (2013.01); *G08B 25/10* (2013.01); *G06K 2009/00738* (2013.01)

(58) Field of Classification Search
USPC ............... 382/100–121, 152, 181–218, 312
See application file for complete search history.

(56) References Cited

U.S. PATENT DOCUMENTS

| | | | |
|---|---|---|---|
| 4,917,198 A | 4/1990 | Sing | |
| 5,378,860 A | 1/1995 | Dingfelder | |
| 5,608,193 A * | 3/1997 | Almogaibil | G01G 19/42 177/25.13 |
| 2017/0123399 A1* | 5/2017 | Londo | G05B 19/048 |
| 2018/0091782 A1* | 3/2018 | Bashkin | G07C 9/00563 |
| 2019/0147587 A1* | 5/2019 | Mullins | G02B 27/0172 382/103 |
| 2019/0385732 A1* | 12/2019 | Schoville | G16H 40/20 |

* cited by examiner

*Primary Examiner* — Marcellus J Augustin
(74) *Attorney, Agent, or Firm* — Mahesh Law Group PC; Kumar Maheshwari

(57) ABSTRACT

The present disclosure relates to a method and system for facilitating tray management by determining at least one missing tool from the plurality of tools placed in tray. The tray management system (TMS) is connected to a weighing system to measure combined weight of tools before and after usage of tools. The combined weight of the tools is measured after at least one tool is removed for usage from the tray or placed back in the tray and a weight discrepancy is determined dynamically. Using the weight discrepancy, image sensor captures plurality of video segments. The TMS identifies occurrences of removing at least one tool from the tray and the corresponding occurrence of placing the tool in the tray in video segments and determines missing tool in the tray. The TMS alerts the user about the missing of tools in real time and enables effective tray management.

18 Claims, 13 Drawing Sheets

METHOD AND SYSTEM FOR FACILITATING TRAY MANAGEMENT

CROSS REFERENCES TO RELATED APPLICATIONS

This application claims benefit of U.S. Provisional Patent Application Ser. No. 62/563,527, filed on Sep. 26, 2017, the disclosure of which is incorporated by reference in its entirety.

FIELD OF THE DISCLOSURE

The present subject matter is related, in general, to method and system for inventory management especially, related to method and system for facilitating tray management in fields that requires strict maintenance of inventory of tools and equipment.

BACKGROUND

Currently, tool inventory management in pre- and post-stages of a process have gained significant importance in varied industrial fields like medical, automotive, aeronautics, construction and building maintenance, dispatch and equipment control departments. The use of hand tools, especially in a medical surgical process or in aviation and vehicle maintenance industries, requires portable storage of multiple individual tools. Such tools are typically housed in a tray or portable toolboxes, which must be carried from a central storage location to the operation room or work site. As each of the tools is used in a desired process, the inevitable misplacement of the tools may occur, resulting not only in loss of the tools themselves but, far more importantly, the possibility of Foreign Object Damage (FOD) to the patient or vehicle. Especially in case of medical surgery, it would be deadly to leave the surgical tools in the patient's body. The consequence of leaving the foreign bodies after surgery may manifest in different forms immediately after the operation, months or even years after the surgical operation. An immediate follow-up procedure may be needed. Therefore, a need exists to track the missing surgical tools in real time for effective tray management. The following references focus on tray management.

U.S. Pat. No. 4,917,198 issued to Sing, describes a weighing inventory system for weighing several identical objects at the same time. It mainly uses a series of weighing platforms, where each platform is supported on a piston which operates in a fluid pressure cylinder. The computer can determine the weight from the pressure value, store the data, and print out an accurate count of the objects on each platform.

U.S. Pat. No. 5,608,193 issued to Almogaibil discloses a tool inventory control system and method, wherein an electronic scale and a computer are used to track tool inventories.

U.S. Pat. No. 5,378,860 issued to Dingfelder et al disclose a computerized system where a person is weighed upon entering and leaving and an alarm is signaled if the two weight readings do not match.

The above said techniques do not provide an effective method of tray management by detecting the missing tool in real time. The rising number of surgical procedures is creating an urgent demand for technologically advanced processes for determining the missing or lost surgical tools during operation or surgical process. Hence it is desirous to have a system and method for determining the missing tool thereby enabling tray management.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Embodiments of the present disclosure relate to a method of facilitating tray management. The method comprises receiving at least a first data and a second data associated with a plurality of tools placed in a tray. In one embodiment, the first data is obtained before using of the plurality of tools and the second data is obtained after using the plurality of tools. The method further comprises determining a weight discrepancy of the plurality of tools upon receiving the second data, wherein the weight discrepancy is computed as a difference of the first data and the second data. The method further comprises obtaining a plurality of video segments captured by at least one image sensor, wherein each of the plurality of video segments is captured if the weight discrepancy is determined to be finite and continued till the weight discrepancy is determined to be negligible. Using the plurality of video segments, the method identifies at least one missing tool of the plurality of tools placed in the tray.

Further, the present disclosure relates to a tray management system. The system comprises a processor and a memory communicatively coupled with the processor. The memory stores processor-executable instructions, which on execution cause the processor to receive at least a first data and a second data associated with a plurality of tools placed in a tray. In one embodiment, the first data is obtained before usage of the plurality of tools and the second data is obtained after usage of the plurality of tools. The processor is further configured to determine a weight discrepancy of the plurality of tools upon receiving the second data, wherein the weight discrepancy is computed as a difference of the first data and the second data. Further the processor is configured to obtain a plurality of video segments captured by at least one image sensor, wherein each of the plurality of video segments is captured if the weight discrepancy is determined to be finite and continued till the weight discrepancy is determined to be negligible. The processor is further configured to identify at least one missing tool using the plurality of video segments.

Furthermore, the present disclosure relates to a non-transitory computer readable medium including instructions stored thereon that when processed by at least one processor cause a tray management system to perform act of receiving at least a first data and a second data associated with a plurality of tools placed in a tray. In one embodiment, the first data is obtained before usage of the plurality of tools and the second data is obtained after usage of the plurality of tools. The at least one processor is configured to determine a weight discrepancy of the plurality of tools upon receiving the second data, wherein the weight discrepancy is computed as a difference of the first data and the second data. Further the at least one processor is configured to obtain a plurality of video segments captured by at least one image sensor, wherein each of the plurality of video segments is captured if the weight discrepancy is determined to mined to be negligible. The at least one processor is further configured to identify at least one missing tool using the plurality of video segments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and together with the description, explain the disclosed principles. In the figures, the left-most digit(s) of a reference number identifies the figure in which the reference number first appears. Some embodiments of system and/or methods in accordance with embodiments of the present subject matter are now described, by way of example only, and regarding the accompanying figures, in which.

Figure 1A:
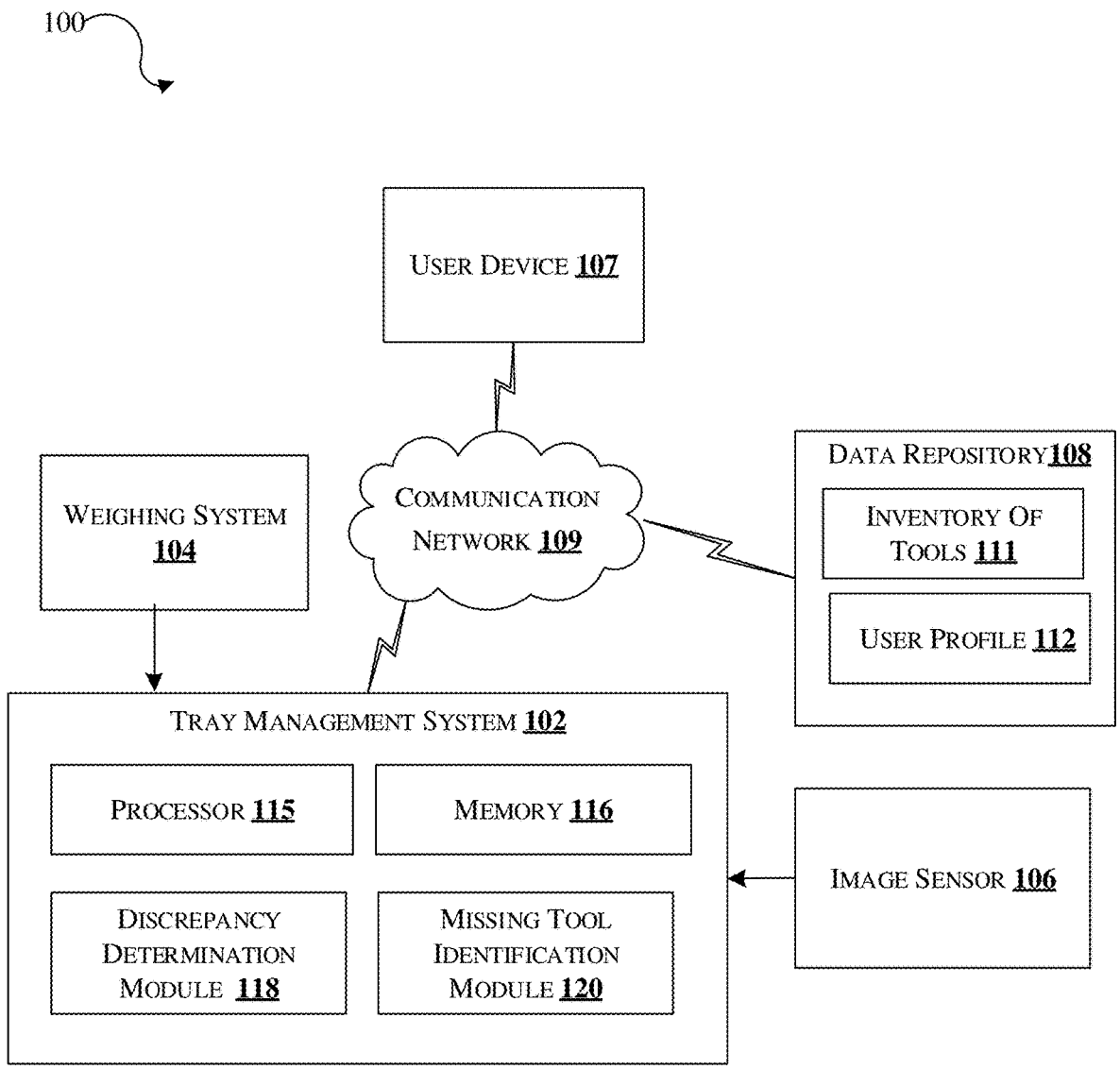
FIG. 1a illustrates an exemplary architecture of a system for facilitating tray management, in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and system for facilitating tray management. More particularly, the proposed method and system determines at least one or more missing tools after usage of a plurality of tools in real time. In one example, the plurality of tools may be used in a medical surgery, a dental surgery and other related surgical procedures in the medical field. The proposed system verifies authenticity of a user for usage of the plurality of tools and determines the user access to the plurality of tools. Upon successful user authentication and determination of user access, the system receives at least a first data and a second data associated with the plurality of tools placed in a tray. The first data is obtained before usage of the plurality of tools and the second data is obtained after usage of each of the plurality of tools in the surgical procedure. In one embodiment, the first data is a combined weight of the plurality of tools measured before usage of the plurality of tools, and the second data is a combined weight of the plurality of tools measured after at least one tool is removed for usage from the tray or placed back in the tray during the surgical procedure. Upon receiving the second data, the proposed system determines a weight discrepancy of the plurality of tools using the first data and the second data. Based on the value of the weight discrepancy, the proposed system obtains a plurality of video segments (or images) captured by at least one or more image sensors and detects the plurality of tools available in each video segment using feature extraction of the plurality of tools. The proposed system identifies one or more occurrences of removing at least one tool from the tray in each video segment, and determines the corresponding occurrence of placing the tool in the tray in current or subsequent video segments. In some embodiments, a reduction in weight may trigger image or video capture and time stamp may be recorded. In the absence of determination of the corresponding occurrence of placing the tool in the tray, the proposed system identifies the at least one tool that is missing from the tray. Upon identification of the at least one missing tool, the proposed system notifies the user of the plurality of tools by displaying an alert about the missing of at least one tool from the tray along with image of the at least one missing tool. The system, in turn receives a user input and generates a recommendation to track the at least one missing tool based on user input.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a illustrates an exemplary architecture of a system for facilitating tray management in accordance with some embodiments of the present disclosure.

As illustrated in FIG. 1a, the exemplary system comprises one or more components for facilitating tray management. The exemplary system 100 comprises a tray management system (hereinafter referred to as TMS) 102, a weighing system 104, one or more image sensors 106-1, 106-2 . . . 106-N (hereinafter collectively referred to as image sensor 106), a user device 107, and a data repository 108 communicatively coupled via a communication network 109. The communication network 109 may be a LAN (local area network), WAN (wide area network), wireless network, point-to-point network, or another configuration. One of the most common types of network in current use is a TCP/IP (Transfer Control Protocol and Internet Protocol) network for communication between database client and database server. Other common Internet protocols used for such communication include HTTPS, FTP, AFS, and WAP and using secure communication protocols etc.

The weighing system 104 may be a weighing device capable of measuring weight of plurality of tools placed in a tray. In one example, the weighing system 104 is a weighing equipment configured with hardware and software components that does not require intervention of user or operator during the weighing process. The weighing system 104 may comprise a digital scale for weighing purposes and a device holder or a tool holder to hold a tray of plurality of tools. In one embodiment, the weighing system 104 may be physically coupled with the TMS 102.

The image sensor 106 may be for example, a camera fixed in operation room or in surrounding regions of execution of a surgical procedure. In another example, the camera may be fixed on display of the TMS 102 so as to capture an image of the tray comprising the plurality of tools. The image sensor 106 may also be configured to capture an image of user for user authentication and to allow access to the plurality of tools. The image sensor 106 may be capable of capturing the image in any file format such as, but not limiting to, as Joint Photographic Experts Group (JPEG), Graphics Interchange Format (GIF), Bitmap Image (BMP), Tagged Image File Format (TIFF) and other common file format used for images that can be converted to any suitable format before processing the images. The image sensor 106 may be for example, a video camera capable of capturing a video feed or video sequence of surgical procedure in any file format such as, but not limiting to, Moving Picture Experts Group (MPEG), Flash Video (FLV), Audio Video Interleave (AVI), Windows Media Video (WMV) and other common file format for videos that can be converted to any suitable format before processing the videos. In one embodiment, the image sensor 106 is configured to capture a plurality of video segments, each video segment capture is initiated when at least one tool is removed from the tray and continues till the at least one tool is placed back in the tray. In another embodiment, the image sensor 106 may be configured to capture the live video of the procedure and display the captured video in the display of the TMS 102. The image sensor 106 may segment the live video into the plurality of video segments or a plurality of still images with outlines that overlay the image to identify each instrument for further processing. In one embodiment, the image sensor 106 stores the plurality of video segments in the data repository 108 coupled with the TMS 102. In another embodiment, the image sensor 106 stores the plurality of video segments in a memory 116 of TMS 102.

The user device 107 may be a mobile device, for example a smart phone, including the functionality for communicating over the network. In one example, the mobile device can be a portable mobile computer (laptop, notebook or sub-notebook), Smart Phone (iOS, Android), personal digital assistant, wireless electronic mail device, tablet computer or other device capable of communicating both ways over the Internet or other appropriate communications network. The user device 107 may comprise an integrated application having a user interface that enables each user to register with the TMS 102 based on user information provided to the TMS 102. In one embodiment, the user device 107 may also comprise an image sensor to capture the image of the user while registering with the TMS 102. The user may be, for example a surgeon or surgical specialist capable of using surgical tools to perform medical surgery. The TMS 102 creates a user profile 112 for each registered user along with user information, surgery history, details of each surgical procedure, and information of the patient operated by the user. The user information may be, for example, surgeon name, department of specialization, educational qualifications, certifications, experience details and so on. In one example, the user profile 112 may be stored in the data repository 108.

The data repository 108 also stores inventory of tools 111 that may comprise, for example, a list of tools available for each department in an organization, historical images of the tools, details of tools lost or missing earlier, and other information related to tool inventory of the organization. The data repository 108 may be integrated with TMS 102, in one embodiment. In another embodiment, the data repository 108 may be configured as a standalone device independent of TMS 102.

The TMS 102 is configured to facilitate tray management, especially to manage the availability of tools before and after the surgical procedure. In one embodiment, the TMS 102 is configured to monitor the usage of the tools in the surgical procedure and alert the user in real time about any missing tools that was used in the surgical procedure. The TMS 102 comprises at least a processor 115 and a memory 116 coupled with the processor 115. The TMS 102 further comprises a discrepancy determination module 118 and a missing tool identification module 120. The discrepancy determination module 118 is configured to determine a weight discrepancy of the plurality of tools using combined weight of plurality of tools measured before and after usage of at least one tool. The difference of the combined weight and the weight after an instrument/tool is removed from the tray, allows for creating an alert for the user that an instrument/tool is removed and allows the system to determine the approximate weight of the instrument/tool that was removed for usage. The missing tool identification module 120 is configured to identify the at least one missing tool of the plurality of tools used in the surgical procedure.

Figure 1B:
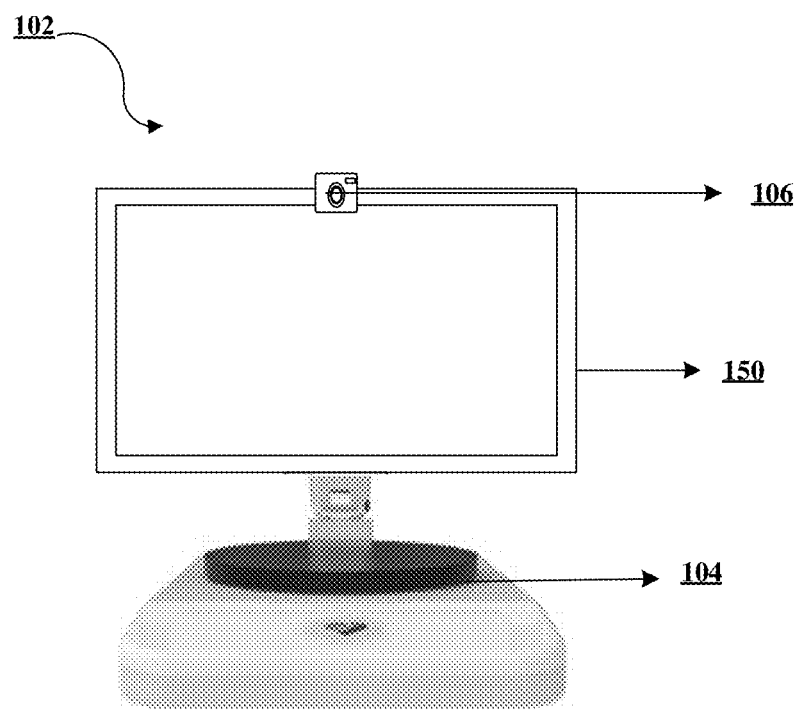
FIGS. 1b and 1c illustrate an exemplary arrangement of tray management system in accordance with some embodiments of the present disclosure.
Figure 1C:
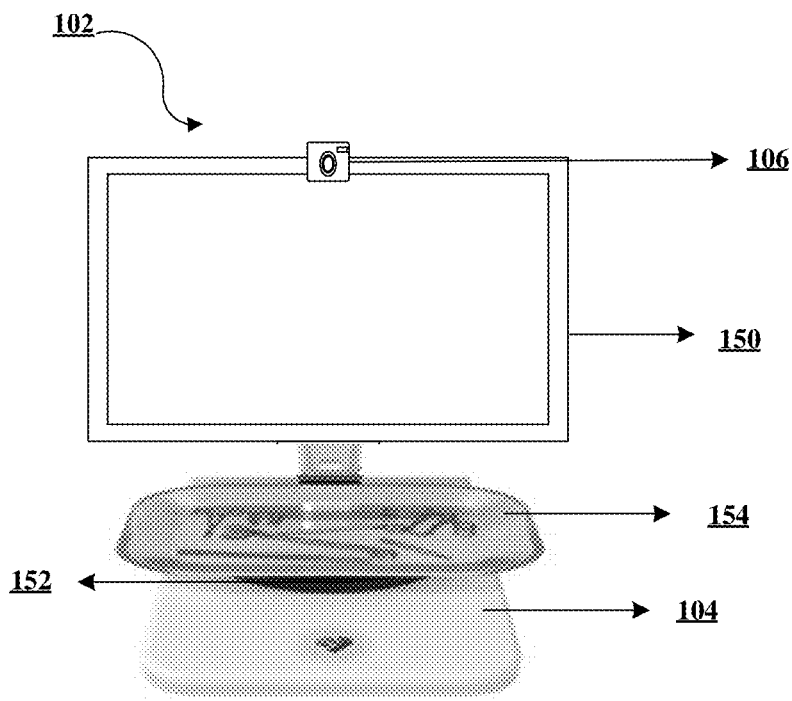

In one example, the TMS 102 may be configured as a standalone system. In another example, the TMS 102 may include a desktop personal computer, workstation, laptop, PDA, cell phone, or any WAP-enabled device or any other computing device capable of interfacing directly or indirectly to the Internet or other network connection. The TMS 102 typically includes one or more user interface devices, such as a keyboard, a mouse, touch screen, pen or the like, for interacting with the GUI provided on a display. The TMS 102 also includes user interface provided therein for interacting with the data repository 108 to access the inventory of tools 111 and the user profile 112. In one example, a typical arrangement of TMS 102 with the weighing system 102 is illustrated in FIG. 1b. The TMS 102 may comprise a display device 150 and the weighing system 104 integrated with the processor 115 as illustrated in FIG. 1b. Further, the processor 115 is coupled to the image sensor 106 to capture the plurality of video segments while the user executing the surgical procedure. FIG. 1c depicts an exemplary view of TMS 102 in combination with weighing system 104, wherein the weighing system 104 comprises a device holder 152 to hold a tray 154 comprising the plurality of tools.

Figure 2:
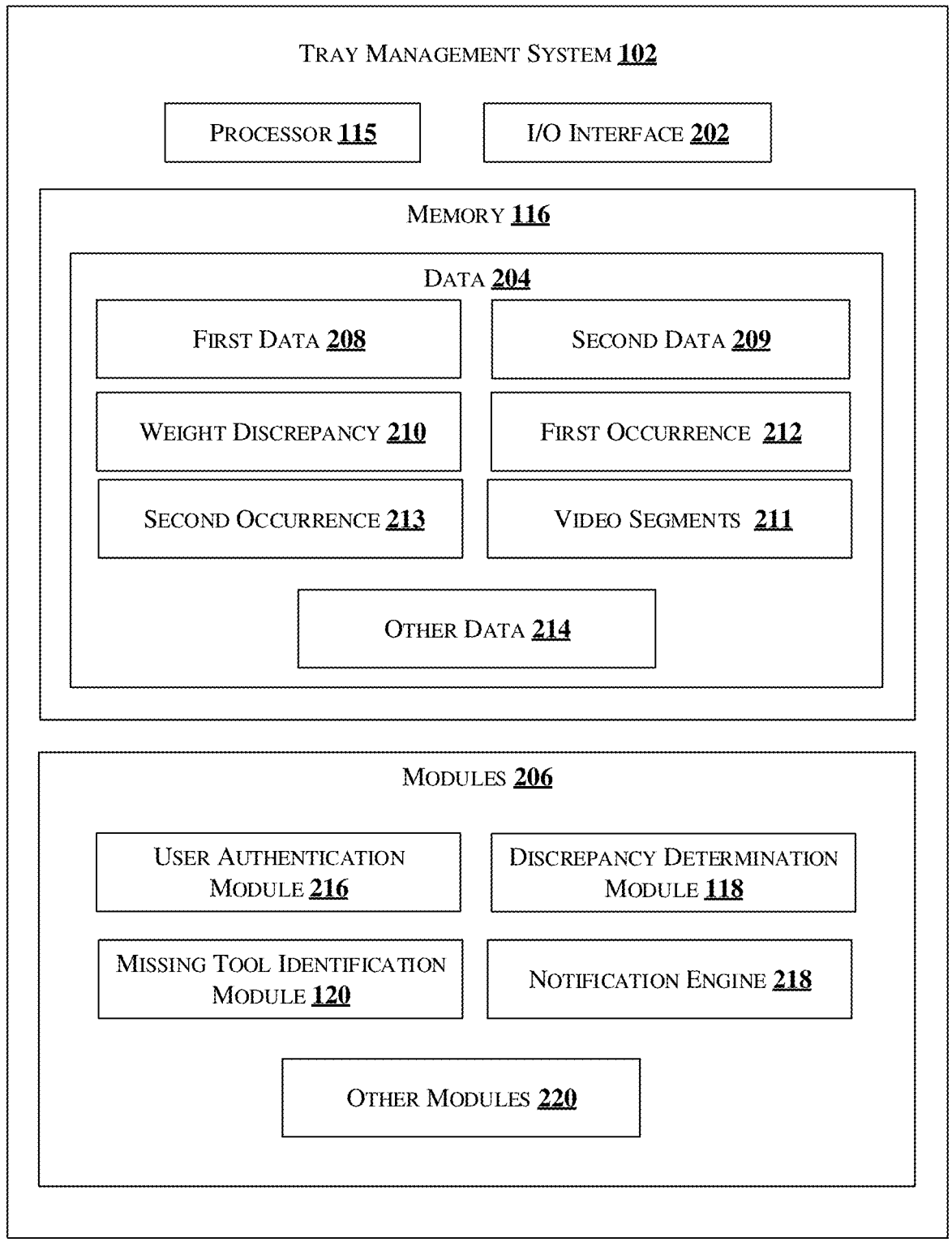
FIG. 2 shows a detailed block diagram illustrating tray management system of FIG. 1 in accordance with some embodiments of the present disclosure.

The TMS 102 may be a typical TMS as illustrated in FIG. 2. In one embodiment, the TMS 102 comprises the processor 115, the memory 116, and an I/O interface 202. The TMS 102 further includes data 204 and one or more modules 206. In one implementation, the data 204 may be stored within the memory 116. In one example, the data 204 may include a first data 208, a second data 209, weight discrepancy 210, plurality of video segments 211, first occurrence data 212, second occurrence data 213 and other data 214. In some embodiments, the data 204 may be stored within the memory 116 in the form of various data structures. Additionally, the data 204 may be organized using data models, such as relational or hierarchical data models. The other data 214 may store temporary data and temporary files, generated by the components for performing the various functions of the TMS 102.

The modules 206 may include, for example the discrepancy determination module 118, the missing tool identification module 120, a user authentication module 216 and a notification engine 218. The modules 206 may comprise other modules 220 to perform various miscellaneous functionalities of the TMS 102. In one embodiment, the other modules 220 may comprise a user registration module that may be capable of enabling registration of a user with the TMS 102. It will be appreciated that such aforementioned modules may be represented as a single module or a combination of different modules. The modules may be implemented in the form of software executed by a processor, hardware and/or firmware.

In operation, the TMS 102 authenticates the user before initiating the surgical procedure. The TMS 102 initially displays one or more options on the display device 150 such as history of surgical procedures performed by the user, active procedures comprising successful procedures, and a new procedure to start the execution of new surgical procedure. The user may select any of the above options, including but not limited to, the new procedure option. The user authentication module 216 receives the image of the user captured by the image sensor 106 and verifies the user using the user image. In one example, the user authentication module 216 authenticates the user by using facial recognition technique on the user image. Further, the user authentication module 216 determines the user access to the plurality of tools based on the user information in the user profile 112 such as department of specialization, credentials, experience details and so on. Based on a successful determination of the user access to the plurality of tools, the user authentication module 216 verifies the user as an authorized user for the plurality of tools. The TMS 102 may alert the user to place the tray 154 comprising the plurality of tools on the device holder 152 of the weighing system 104. The weighing system 104 initially determines the first data 208 before using the plurality of tools in the surgical procedure and transmits the first data 208 to the discrepancy determination module 118. In one example, the first data 208 is the combined weight of the plurality of tools measured before at least one tool is used by the user to perform the surgical procedure. During the surgical procedure, the weighing system 104 measures the second data 209 each time after at least one tool is removed for usage from the tray 154 or placed back in the tray 154. This allows the system to calculate the weight of the tool that was added or removed from the tray. In one example, the second data 209 is the combined weight of the plurality of tools available in the tray 154 after the at least one tool is removed from the tray 154 or placed back into the tray 154. In another example, the second data 209 may also comprise additional data such as timestamp associated with the combined weight data recorded each time after the at least one tool is removed from or placed in the tray 154.

The discrepancy determination module 118 receives the second data 209 measured by the weighing system 104 each time when at least one tool is removed from the tray 154 or placed back into the tray 154. Upon receiving the second data 209, the discrepancy determination module 118 dynamically determines the weight discrepancy 210 of the plurality of tools using the first data 208 and the second data 209 for the respective timestamp data. In one example, the weight discrepancy 210 may be computed as the difference of the initial combined weight of the plurality of tools i.e., first data 208 and the combined weight of the available plurality of tools after at least one tool is removed or placed back in the tray 154.

Based on the determination of the weight discrepancy 210, the missing tool identification module 120 obtains the plurality of video segments 211 captured by the image sensor 106. In one embodiment, if the weight discrepancy 210 is determined to be a finite value, the missing tool identification module 120 enables the image sensor 106 to automatically initiate capture of each video segment and continue capturing the video segment till the value of the weight discrepancy 210 is determined to be negligible. The finite value of the weight discrepancy 210 indicates the removal of at least one tool from the tray 154 for the usage of at least one tool, wherein the negligible value of the weight discrepancy 210 indicates restoration of used tools back in the tray 154. The missing tool identification module 120 also determines length of each video segment indicating the time period of each video segment. In one embodiment, the image sensor 106 continues to capture current video segment till the missing tool identification module 120 determines the length of the video segment exceed a maximum threshold time period. In one example, the maximum threshold time period may indicate a maximum time period of usage of plurality of tools that is predetermined using data obtained from multiple surgical procedures. For example, the data may comprise details of usage of plurality of tools in multiple surgical procedures. In another example, the data may include video recordings of execution of multiple surgical procedures. The missing tool identification module 120 further obtains the plurality of video segments 211, each video segment indicating the usage of at least one tool in the surgical procedure. Using the plurality of video segments 211, the missing tool identification module 120 determines the at least one missing tool from the plurality of tools placed in the tray 154.

In one embodiment, the missing tool identification module 120 detects the plurality of tools available in each video segment using feature extraction of the plurality of tools. The feature extraction may include the ability to use pixel comparison to determine the outline of an instrument. In one example, the missing tool identification module 120 may use any object detection technique to detect the plurality of tools available in the plurality of video segments 211 using historical images of the plurality of tools stored in the tool inventory 111 that have been previously identified by the image. The missing tool identification module 120 further identifies one or more first occurrence data 212 of at least one tool in each video segment. In one example, the first occurrence data 212 indicates an instance of removing at least one tool from the tray 152 for usage. Upon identifying the first occurrence data 212, the missing tool identification module 120 determines the second occurrence data 213 corresponding to the first occurrence data 212 using time displayed in one of the current video segments and subsequent plurality of video segments 211. In one example, the second occurrence data 213 indicates an instance of restoring the used tool back in the tray 154 for each identified first occurrence data 212 of removing the same tool. If the missing tool identification module 120 determines absence of the second occurrence data 213 of restoring or placing back the used tool in the tray 154 for the corresponding first occurrence data 212, then the tool is determined as the missing tool. Upon determining the at least one missing tool in the plurality of video segments 211, the notification engine 218 displays an alert about the missing of at least one tool from the tray 154 on the display device 150.

In one embodiment, the notification engine 218 obtains an image of the missing tool from the video segments 211 and displays an alert that at least one instrument/tool is missing, along with the image of the missing tool and timestamp corresponding to occurrence of the removing of the missing tool from the tray 154. The alert may also request a suitable response from the user about the progress of the surgical procedure. If the user believes that the missing tool may be still required for usage in the surgical procedure, the user may provide a response to the alert indicating the further requirement or continued usage of the missing tool. If the user believes that the missing tool is no longer being used by the user or that the surgical procedure has been completed, the user may provide an input indicating completion of usage of the missing tool or completion of the surgical procedure. The notification engine 218 receives the response from the user, and optionally generates a suitable recommendation based on the current status of the surgical procedure. In one aspect, the notification engine 218 generates a recommendation to track the at least one missing tool if the user input is received as completion of the usage of the at least one missing tool. The user may lookout for the missing tool in the nearby location, surgical table immediately before concluding the surgical procedure. Further, the notification engine 218 updates the user profile of the user with time stamp details of the usage of each of the plurality of tools, image of the at least one missing tool obtained from the plurality of video segments, the user input received in response to the alert, and the recommendation generated based on the user input. If the user is able to successfully track the missing tool and place the missing tool back in the tray, the discrepancy determination module 118 may terminate capturing of the plurality of video segments, and record the timestamp associated with the plurality of tools. Thus, the proposed system dynamically identifies the missing tool while performing the surgical procedure and alerts the user i.e., the surgeon about the missing of at least one tool from the plurality of tools and thereby enabling effective tray management and avoids foreign object damage (FOD) to the patient in real time.

Figure 3A:
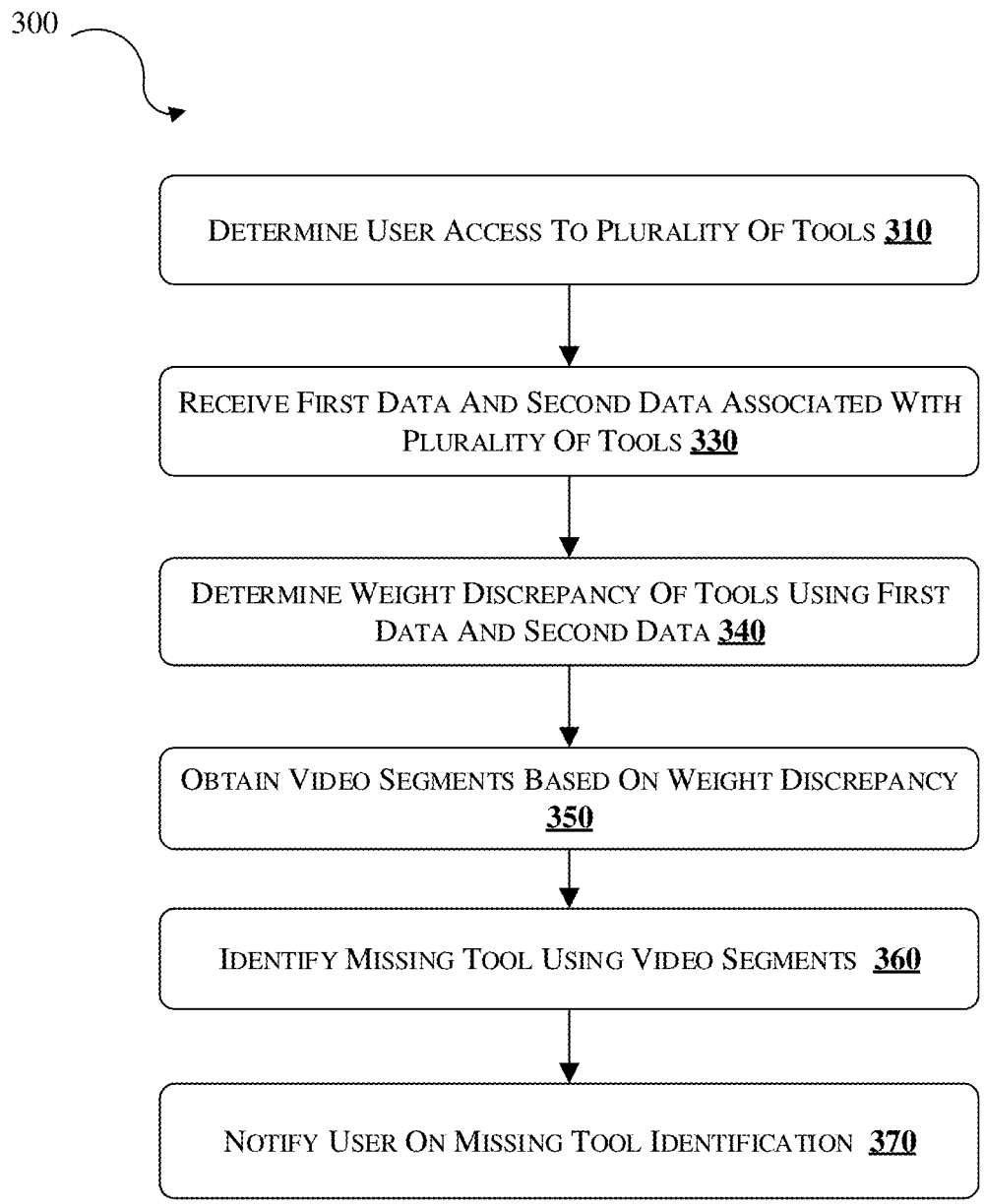
FIG. 3a shows a flowchart illustrating a method of facilitating tray management in accordance with some embodiments of the present disclosure.

FIG. 3a shows a flowchart illustrating a method 300 of facilitating tray management in accordance with some embodiments of the present disclosure.

As illustrated in FIG. 3a, the method 300 includes one or more blocks illustrating a method of facilitating tray management using the TMS 102. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Figure 3B:
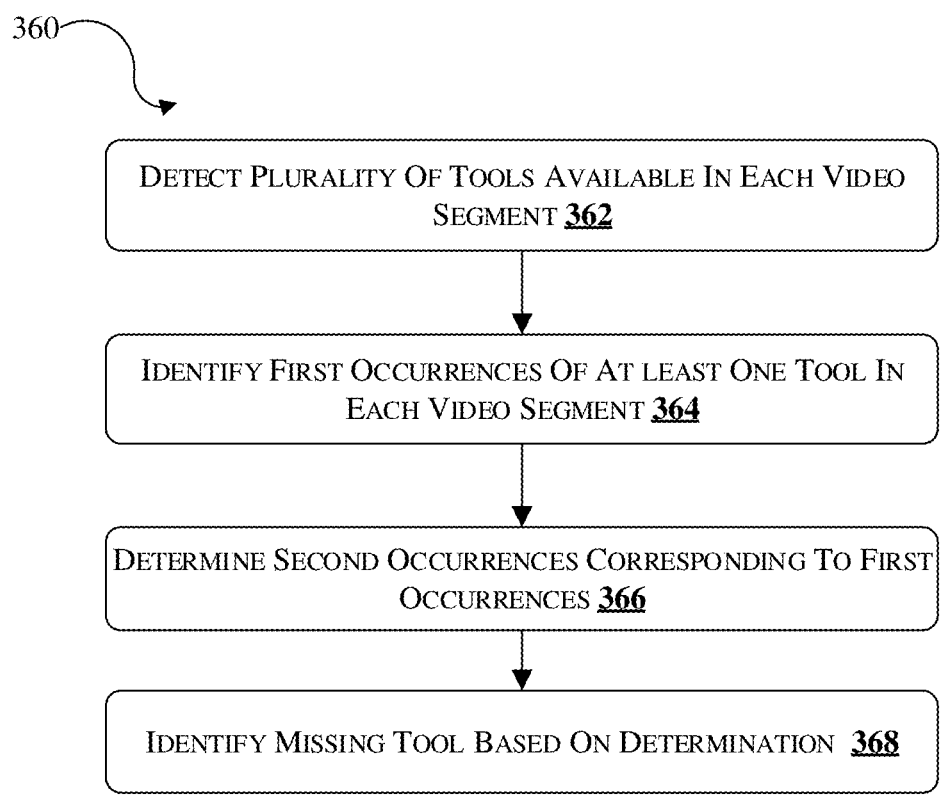
FIG. 3b shows a flowchart illustrating a method of identifying missing tools in accordance with some embodiments of the present disclosure.
Figure 3C:
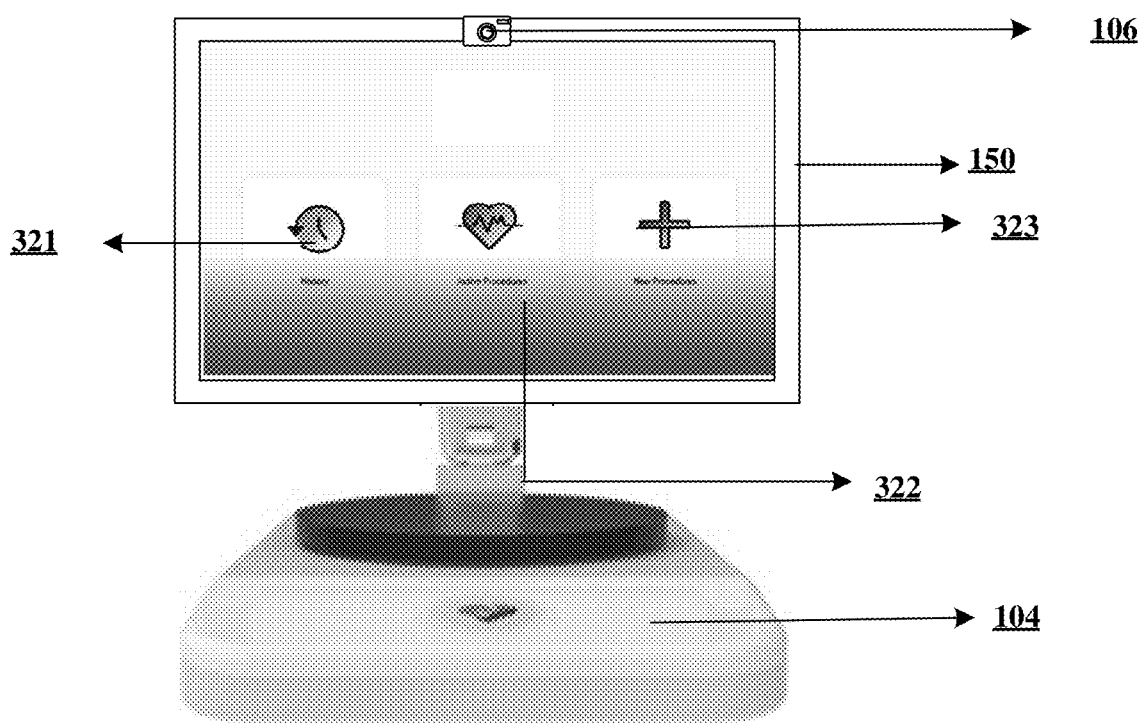
FIG. 3c depicts an exemplary screenshot illustrating home page of tray management system in accordance with some embodiments of the present disclosure.
Figure 3D:
FIGS. 3d-3n depict exemplary screenshots depicting interactive user interface of the tray management system in accordance with some embodiments of the present disclosure.
Figure 3E:
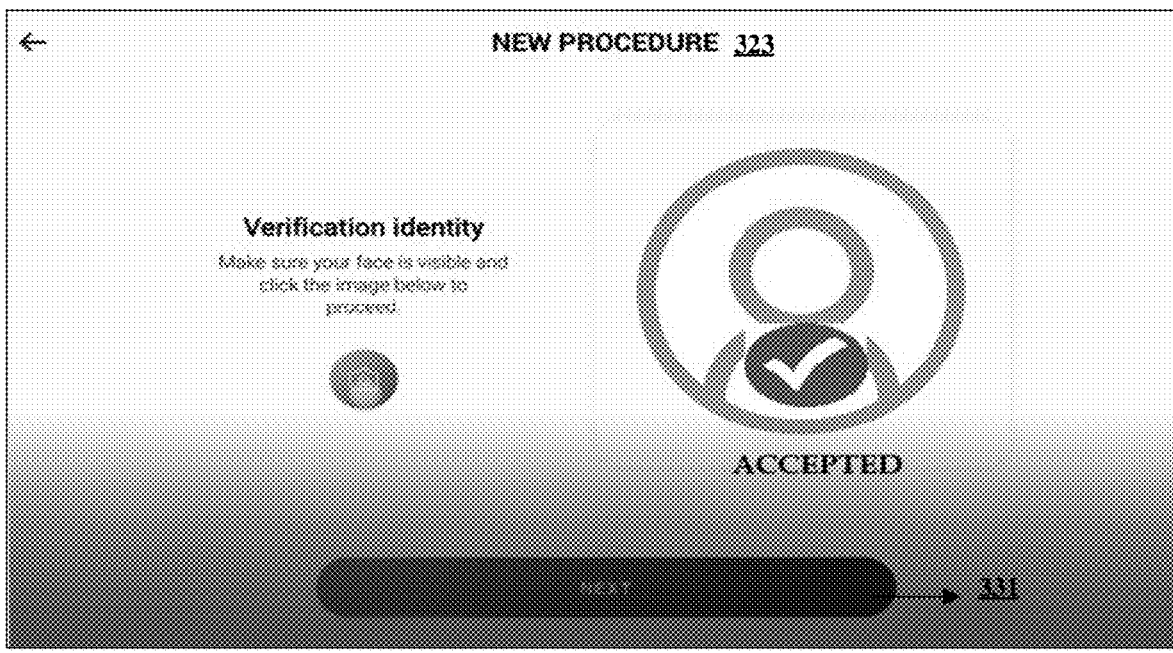

At block 310, user authentication to access the plurality of tools is determined. The TMS 102 initially displays one or more options on the display device 150. The one or more default options may be for example, history 321 of surgical procedures performed by the user, active procedures 322 comprising successful procedures, and a new procedure 323 as illustrated in FIG. 3c. In real time, the user for example, the doctor or the surgeon may select the new procedure 323 to perform new surgical procedure. The user authentication module 216 authenticates the user, before initiating the surgical procedure. In one embodiment, the user authentication module 216 receives the image of the user captured by the image sensor 106 as illustrated in FIG. 3d and verifies the user's identify using the image. In one example, the user authentication module 216 authenticates the user by using facial recognition technique on the user image as depicted in FIG. 3e. Further, the user authentication module 216 determines the user access to the plurality of tools based on the user information in the user profile 112 such as department of specialization, experience details and so on. Based on successful determination of the user access to the plurality of tools, the user authentication module 216 verifies the user as an authorized user to use the plurality of tools.

Figure 3F:
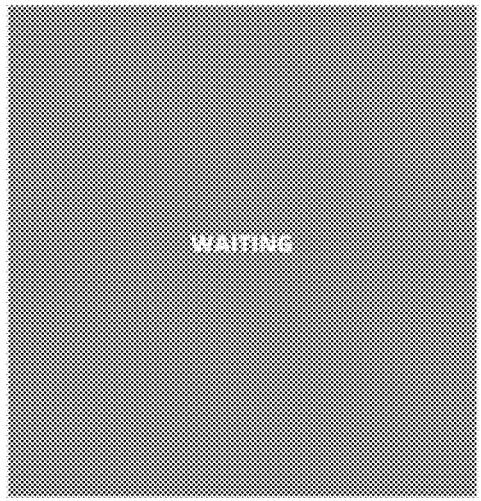
Figure 3F:

At block 330, the first data 208 and the second data 209 associated with the plurality of tools is received. Upon successful determination of user access to the plurality of tools, the user may click the button next 331 as illustrated in FIG. 3e to proceed with recording the tools with TMS 102. The TMS 102 may alert the user to input the plurality of tools as illustrated in FIG. 3f. The user may place the tray 154 comprising the plurality of tools on the device holder 152 of the weighing system 104 for recording the first data 208 of the instruments. The weighing system 104 determines the first data 208 before using the plurality of tools in the surgical procedure and transmits the first data 208 to the discrepancy determination module 118. In one example, the first data 208 is the combined weight of the plurality of tools measured before even at least one tool is used by the user to perform the surgical procedure. Upon successful recording of the first data 208, the user may proceed with execution of the surgical procedure upon clicking button next 332 as shown in FIG. 3f. During the surgical procedure, the weighing system 104 measures the second data 209 each time after at least one tool is removed for usage from the tray 154 or placed back in the tray 154. In one example, the second data 209 is the combined weight of the plurality of tools available in the tray 154 after the at least one tool is removed from the tray 154 or placed back into the tray 154. In another example, the second data 209 may also comprise additional data such as timestamp associated with the combined weight data recorded each time after the at least one tool is removed from or placed in the tray 154. The discrepancy determination module 118 receives the second data 209 measured by the weighing system 104 each time when the at least one tool is removed from the tray 154 or placed back into the tray 154. Based on the received first data 208 and the second data 209, the weight discrepancy 210 is determined.

At block 340, the weight discrepancy 210 is determined using the first data 208 and the second data 209. In one embodiment, the discrepancy determination module 118 determines the weight discrepancy 210 of the plurality of tools dynamically each time when the second data 209 is received using the first data 208 and the second data 209 for the respective timestamp data. In one example, the weight discrepancy 210 may be computed as the difference of the initial combined weight of the plurality of tools i.e., first data 208 and the combined weight of the available plurality of tools after at least one tool is removed or placed back in the tray 154.

At block 350, the plurality of video segments 211 are obtained based on determination of the weight discrepancy 210. In one embodiment, the missing tool identification module 120 obtains the plurality of video segments 211 captured by the image sensor 106. If the weight discrepancy 210 is determined to be a finite value, the missing tool identification module 120 enables the image sensor 106 to automatically initiate capture of each video segment and continue capturing the video segment till the value of the weight discrepancy 210 is determined to be negligible. In one example, the finite value of the weight discrepancy 210 indicates the removal of at least one tool from the tray 154 or the usage of at least one tool, wherein the negligible value of the weight discrepancy 210 indicates restoration of used tools back in the tray 154. The missing tool identification module 120 also determines length of each video segment indicating the time period of each video segment. In one embodiment, the image sensor 106 continues to capture current video segment till the missing tool identification module 120 determines the length of the video segment exceed a maximum threshold time period. In one example, the maximum threshold time period may indicate a maximum time period of usage of plurality of tools that is predetermined using data obtained from multiple surgical procedures. For example, the data may comprise details of usage of plurality of tools in multiple surgical procedures. In another example, the data may include video recordings of execution of multiple surgical procedures. The missing tool identification module 120 thus obtains the plurality of video segments 211, each video segment indicating the usage of at least one tool in the surgical procedure.

At block 360, the at least one missing tool is identified using the plurality of video segments 111. FIG. 3b illustrates the method of identifying at least one missing tool in accordance with some embodiments of the present disclosure.

As illustrated in FIG. 3b, the method 360 includes one or more blocks illustrating a method of identifying at least one missing tool using the plurality of video segments 211. The method 360 may be described in the general context of computer executable instructions. Generally, computer executable instructions can include routines, programs, objects, components, data structures, procedures, modules, and functions, which perform specific functions or implement specific abstract data types.

The order in which the method 360 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 362, the plurality of tools available in each video segment is detected. In one embodiment, the missing tool identification module 120 detects the plurality of tools available in each video segment using feature extraction of the plurality of tools. In one example, the missing tool identification module 120 may use any object detection technique to detect the plurality of tools available in the plurality of video segments 211 using historical images of the plurality of tools stored in the tool inventory 111.

At block 364, first occurrence data 212 of at least one tool in each video segment is identified. In one embodiment, the missing tool identification module 120 further identifies one or more first occurrence data 212 of at least one tool in each video segment. In one example, the first occurrence data 212 indicates an instance of removing at least one tool from the tray 152 for usage.

At block 366, second occurrence data 213 corresponding to the first occurrence data 212 is determined. In one embodiment, the missing tool identification module 120 determines the second occurrence data 213 corresponding to the first occurrence data 212 using time displayed in one of current video segment and subsequent plurality of video segments 211. In one example, the second occurrence data 213 indicates an instance of restoring the used tool back in the tray 154 for each identified first occurrence data 212 of removing the same tool.

At block 368, the at least one missing tool is identified. In one embodiment, if the missing tool identification module 120 determines absence of the second occurrence data 213 of restoring or placing back the used tool in the tray 154 for the corresponding first occurrence data 212, then the tool is determined as the missing tool. In one example, if the second occurrence data 212 of placing the tool in the tray 154 is not found in the current or subsequent plurality of video segments 211 for the corresponding first occurrence data 212 of removing the tool from the tray 154 in the current video segment, then the tool is determined as the missing tool.

Figure 3G:
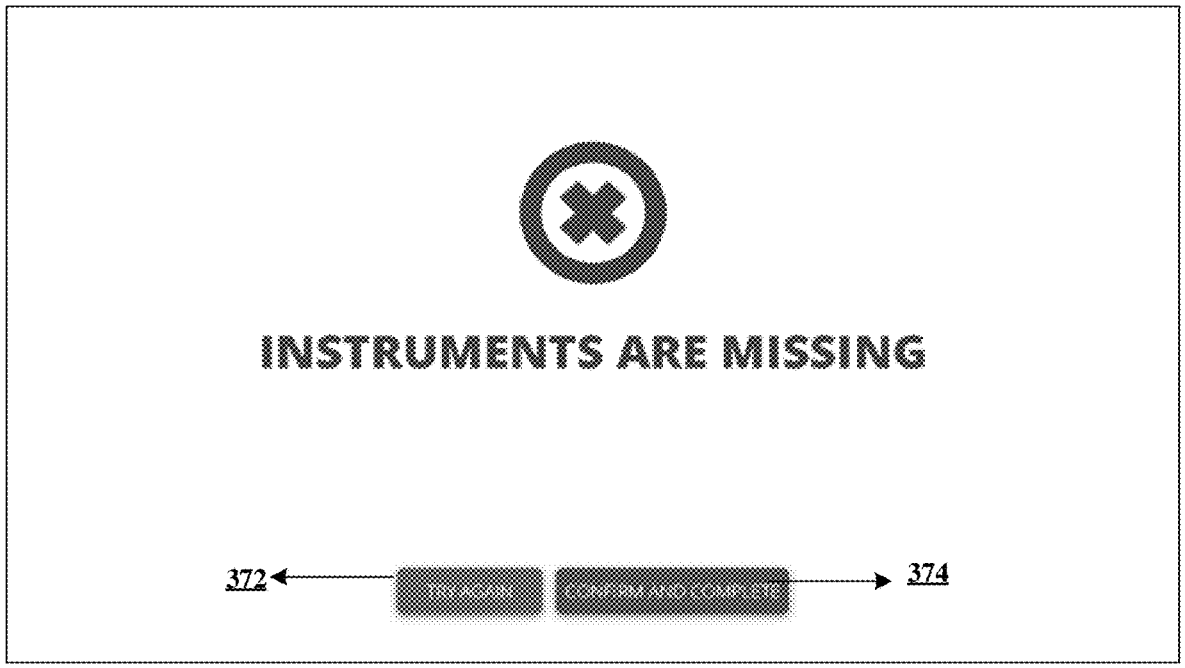
Figure 3H:
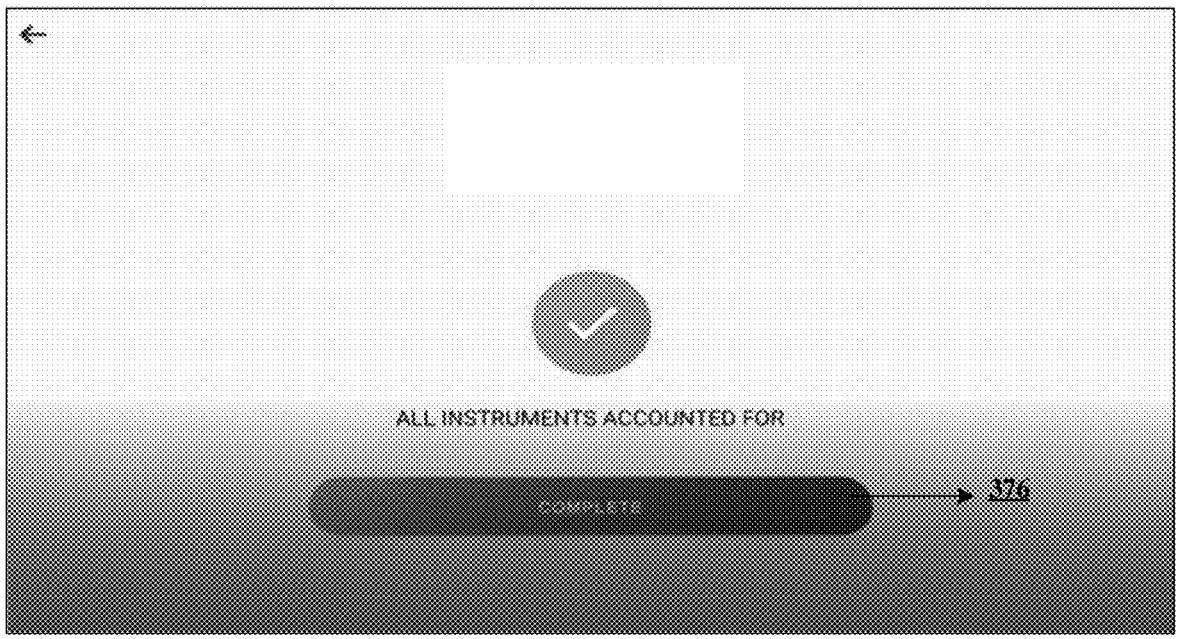

At block 370, the user is notified about the missing tool identification. In one embodiment, upon determining the at least one missing tool in the plurality of video segments 211, the notification engine 218 displays the alert about the missing of at least one tool from the tray 154 on the display device 150. The notification engine 218 obtains an image of the missing tool from the video segments 211 and displays the alert that at least one tool/instrument is missing, along with the image of missing tool and timestamp corresponding to occurrence of the removing of the missing tool from the tray 154 as illustrated in FIG. 3g. The alert may also request a suitable response from the user about the progress of the surgical procedure. If the user believes that the missing tool may be still required for usage in the surgical procedure, the user may provide a response to the alert indicating the further requirement or continued usage of the missing tool. For example, the user may send a response to the alert indicating the continuation of usage of the missing tool by selecting the option or button try again 372 as displayed in FIG. 3g. The notification engine 218 displays at least one subsequent alert after a predefined time if missing tool identification module 120 determines that the same tool is still missing after a predefined time period. If the user believes that the missing tool is no more used by the user or that the surgical procedure is completed, the user may provide an input indicating completion of usage of the missing tool or completion of the surgical procedure by selecting the option confirm and complete 374 as depicted in FIG. 3g. The notification engine 218 receives the response from the user, and optionally generates a suitable recommendation based on the current status of the surgical procedure. In one aspect, the notification engine 218 generates a recommendation to track the at least one missing tool if the user input is received as completion of the usage of the at least one missing tool. The user may lookout for the missing tool in the nearby location, surgical table immediately before concluding with the surgical procedure. Upon completion of surgical procedure, the notification engine displays the message indicating successful count of plurality of tools as illustrated in FIG. 3h. The user may select the button complete 376 as shown in FIG. 3h to enable the TMS 102 update the user profile 112 with the surgical procedure details. Thus, the proposed system dynamically identifies the missing tool while performing the surgical procedure and alerts the user i.e., the surgeon about the missing of at least one tool from the plurality of tools and thereby enabling effective tray management and avoids foreign damage object (FOD) to the patient in real time.

Figures 3I, 3J:
Figure 3K:
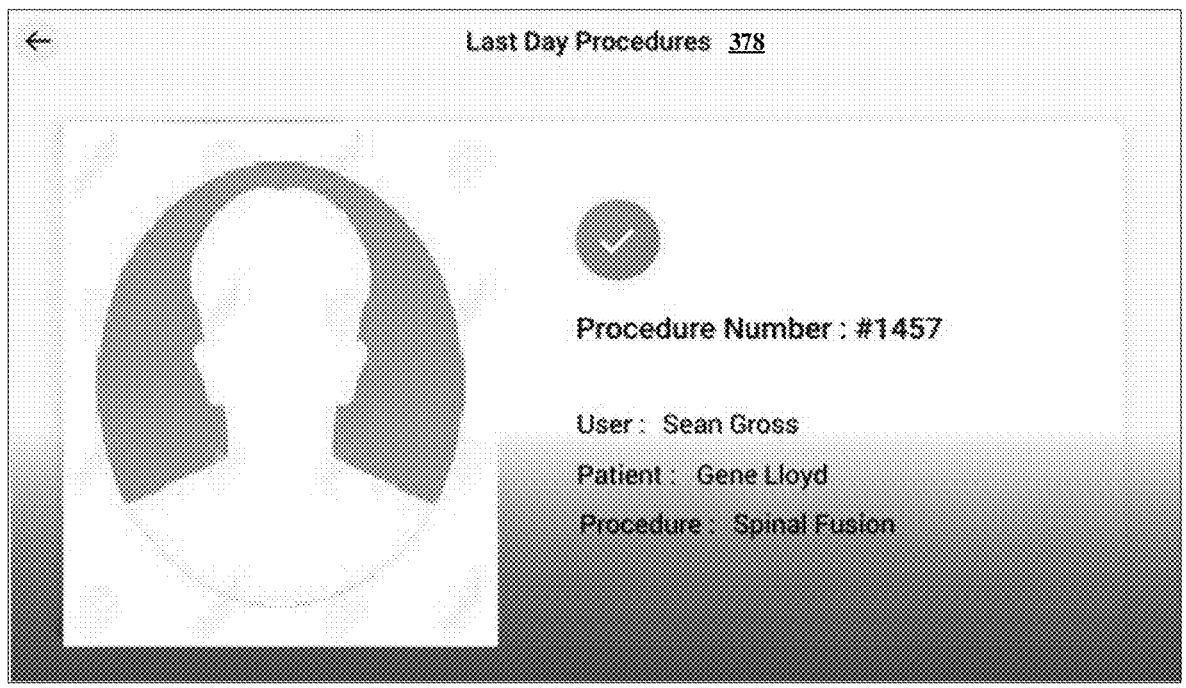
Figure 3L:
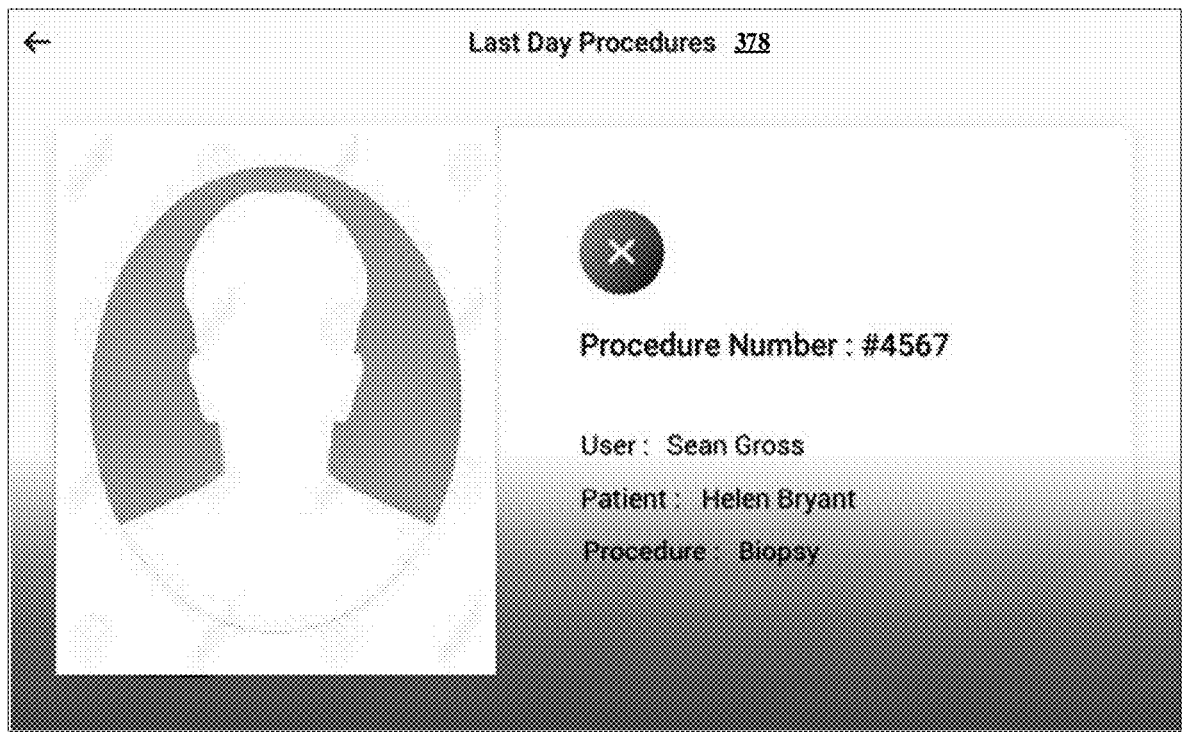
Figure 3M:
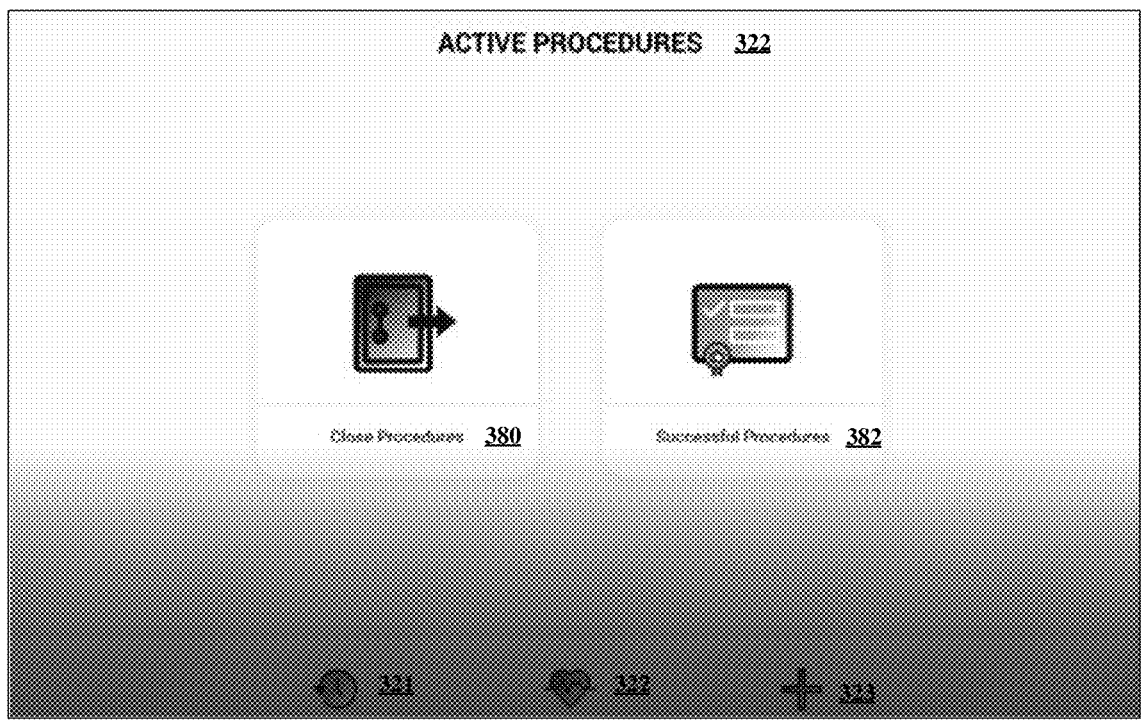
Figure 3N:
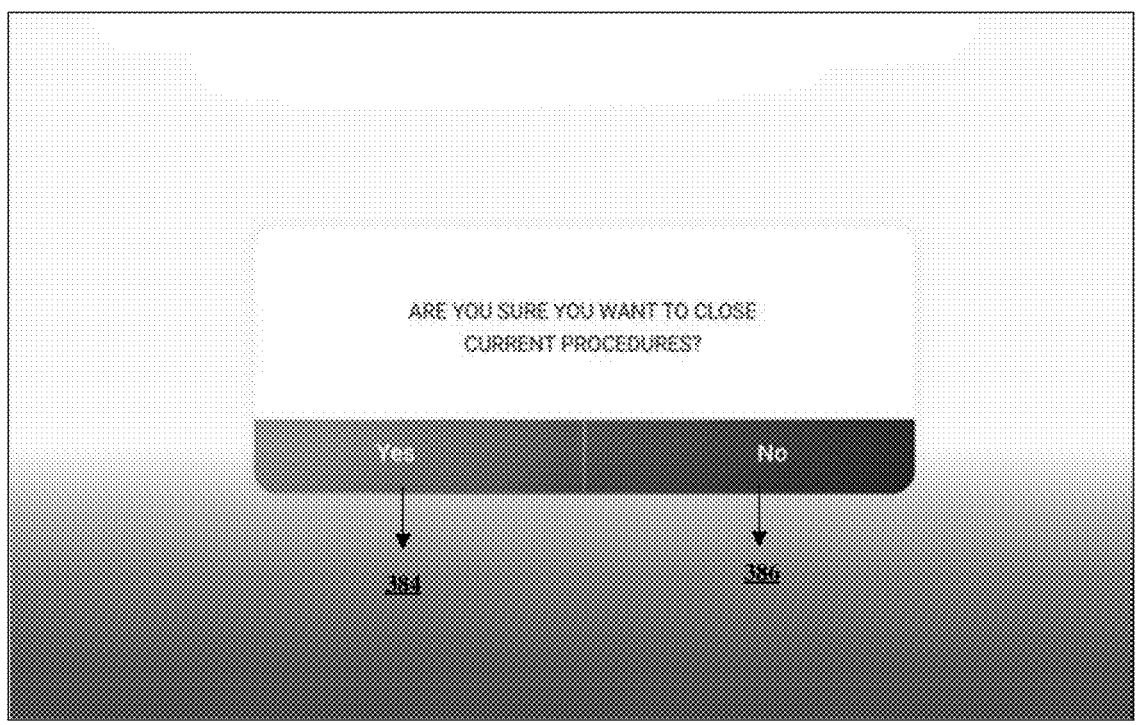

Further, the TMS 102 updates the user profile 112 of the user with the new surgical procedure details comprising procedure number, patient details, type of procedure and other details comprising time stamp details of the usage of each of the plurality of tools, image of the at least one missing tool obtained from the plurality of video segments, the user input received in response to the alert, and the recommendation generated based on the user input. Further, the option history 321 further provides the user with one or more options such as active procedures 322 and last day procedures 378 as illustrated in FIG. 3i. The list of surgical procedures performed by the user in the past are displayed to the user if the user selects the option last day procedures 378 as illustrated in FIG. 3j. For each surgical procedure, the details such as date and time of performance of procedure, patient name, type of procedure and status of usage of tools are displayed to the user. If the surgical procedure does not involve missing of tools during execution of procedure, a favorable or positive status is displayed as illustrated in FIG. 3k. If the surgical procedure involves missing of tools during execution of procedure, an unfavorable or negative status is displayed as illustrated in FIG. 3l. Further, the TMS 102 provides the user with active procedures 322 option that displays the options close procedures 380 and successful procedures 382 as illustrated in FIG. 3m. Further the TMS 102 also allows the user to close or update the procedures with negative status as illustrated in FIG. 3n. The user may close or update the procedures by selecting the option Yes 384 and retain the procedures by selection the option No 386.

Figure 4:
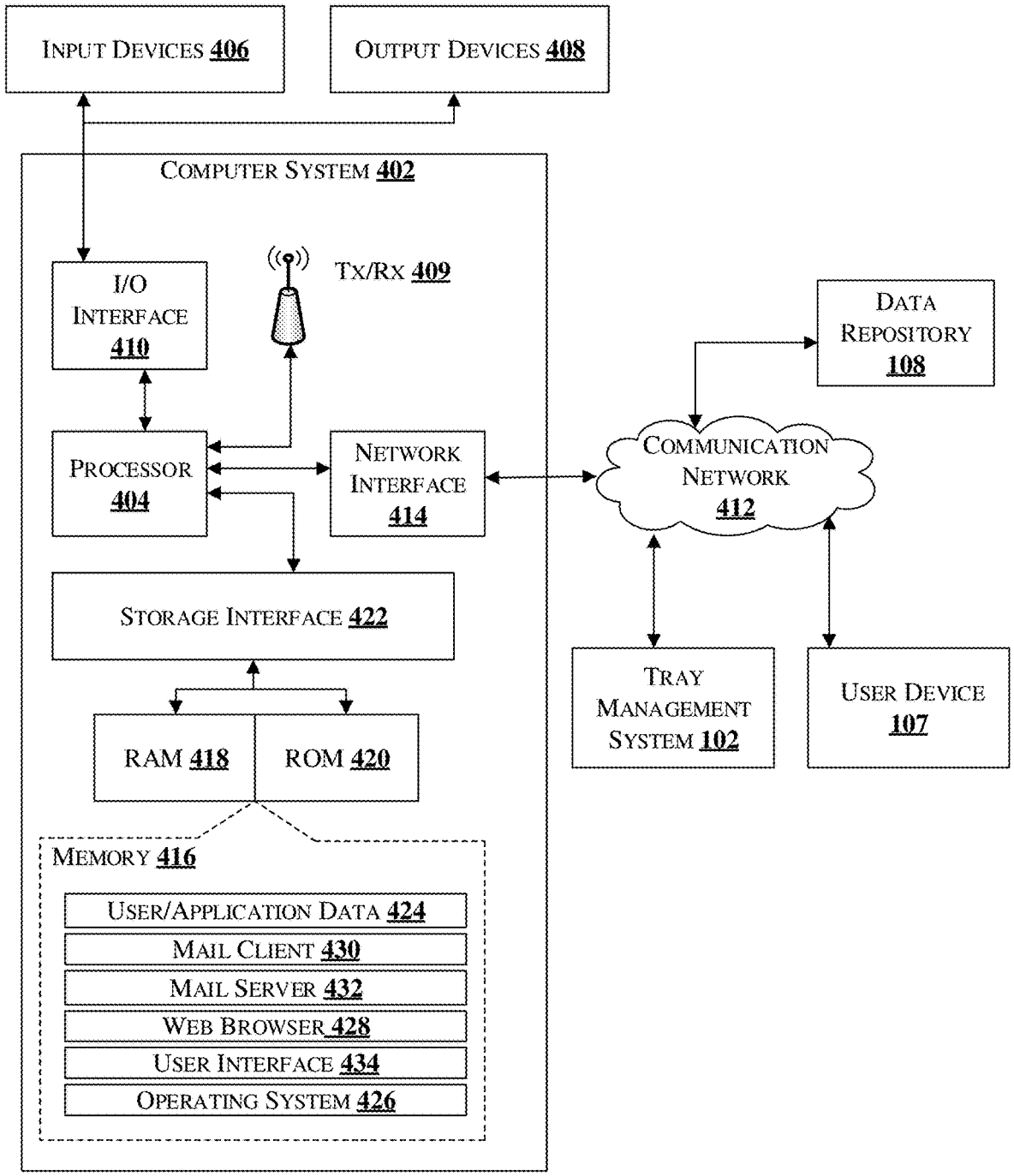
FIG. 4 illustrates a block diagram of an exemplary computer system for implementing embodiments consistent with the present disclosure.

FIG. 4 illustrates a block diagram of an exemplary computer system for implementing embodiments consistent with the present disclosure.

In an embodiment, the computer system 402 may be tray management system 102, used for identifying missing tools. The computer system 402 may include a central processing unit ("CPU" or "processor") 404. The processor 404 may comprise at least one data processor for executing program components for executing user or system-generated business processes. The processor 404 may include specialized processing units such as integrated system (bus) controllers, memory management control units, floating point units, graphics processing units, digital signal processing units, etc.

The processor 404 may be disposed in communication with one or more input/output (I/O) devices (406 and 408) via I/O interface 410. The I/O interface 410 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 410, the computer system 402 may communicate with one or more I/O devices. For example, the input device 406 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 408 may be a printer, fax machine, video display (e.g., cathode ray tube (CRT), liquid crystal display (LCD), light-emitting diode (LED), plasma, or the like), audio speaker, etc. In some embodiments, a transceiver 409 may be disposed in connection with the processor 404. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some implementations, the processor 404 may be disposed in communication with a communication network 412 via a network interface 414. The network interface 414 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 414 and the communication network 412, the computer system 402 may be connected to the tray management system 102, the user device 107 and data repository 108.

The communication network 412 can be implemented as one of the several types of networks, such as intranet or any such wireless network interfaces. The communication network 412 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 412 may include a variety of network devices, including routers, bridges, servers, computing devices, storage devices, etc.

In some embodiments, the processor 404 may be disposed in communication with a memory 416 e.g., RAM 418, and ROM 420, etc. as shown in FIG. 4, via a storage interface 422. The storage interface 422 may connect to memory 416 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 416 may store a collection of program or database components, including, without limitation, user/ application 424, an operating system 426, a web browser 428, a mail client 430, a mail server 432, a user interface 434, and the like. In some embodiments, computer system 402 may store user/application data 424, such as the data, variables, records, etc. as described in this invention. Such databases may be implemented as fault-tolerant, relational, scalable, secure databases such as Oracle or Sybase.

The operating system 426 may facilitate resource management and operation of the computer system 402. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™, Ubuntu™, K-Ubuntu™, etc.), International Business Machines (IBM™) OS/2™, Microsoft Windows™ (XP™, Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 402, such as cursors, icons, check boxes, menus, windows, widgets, etc. Graphical User Interfaces (GUIs) may be employed, including, without limitation, Apple™ Macintosh™ operating systems' Aqua™, IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
receiving, by a processor of a tray management system, at least a first data and a second data associated with a plurality of tools placed in a tray, wherein the first data is obtained before usage of the plurality of tools and the second data is obtained after usage of the plurality of tools;
determining, by the processor, a weight discrepancy of the plurality of tools upon receiving the second data, wherein the weight discrepancy is computed as a difference of the first data and the second data;
obtaining, by the processor, a plurality of video segments captured by at least one image sensor, wherein each of the plurality of video segments is captured if the weight discrepancy is determined to be above a threshold and continues till the weight discrepancy is determined to be below the threshold;
identifying, by the processor, at least one missing tool using the plurality of video segments;
displaying an alert about the missing of at least one tool from the tray, wherein the alert comprises at least an image of the missing tool and time corresponding to occurrence of removing of the at least one missing tool from the tray;
receiving a user input in response to the alert, wherein the user input may indicate one of continuation and completion of the usage of the plurality of tools; and
generating a recommendation to track the at least one missing tool if the user input is received as completion of the usage of the plurality of tools.

2. The method as claimed in claim 1, wherein the first data is a combined weight of the plurality of tools measured before usage of the plurality of tools and upon verifying a user of the plurality of tools, and the second data is combined weight of the plurality of tools measured after at least one tool is removed for usage from the tray or placed back in the tray.

3. The method as claimed in claim 2, wherein verifying the user of the plurality of tools comprising steps of:
receiving an image of the user captured by the at least one image sensor;

determining access to the plurality of tools by the user based on user image and user profile corresponding to the user; and verifying the user as authorized user to access the plurality of tools based on successful determination of access to the plurality of tools.

4. The method as claimed in claim 1, wherein capturing of each video segment is continued till length of the current video segment exceeding a maximum threshold time period.

5. The method as claimed in claim 1, wherein identifying the at least one missing tool comprising steps of:

detecting at least one tool available in each video segment of the plurality of tools;

identifying one or more occurrences of removing the at least one tool from the tray in each video segment;

determining a successive occurrence of placing the at least one tool in the tray for each previous occurrence of removing the at least one tool in one of current and subsequent plurality of video segments; and identifying the at least one missing tool in absence of the determination of successive occurrence of placing the tool in the tray in one of the current and subsequent plurality of video segments.

6. The method as claimed in claim 1, further comprising updating the user profile of the user with time stamp details of the usage of each of the plurality of tools, image of the at least one missing tool obtained from the plurality of video segments, the user input received in response to the alert, and the recommendation generated based on the user input.

7. A tray management system comprising:

a processor;

a memory communicatively coupled with the processor, wherein the memory stores processor-executable instructions, which on execution cause the processor to:

receive at least a first data and a second data associated with a plurality of tools placed in a tray, wherein the first data is obtained before usage of the plurality of tools and the second data is obtained after usage of the plurality of tools;

determine a weight discrepancy of the plurality of tools upon receiving the second data, wherein the weight discrepancy is computed as a difference of the first data and the second data;

obtain a plurality of video segments captured by at least one image sensor, wherein each of the plurality of video segments is captured if the weight discrepancy is determined to be above a threshold and continues till the weight discrepancy is determined to be below the threshold;

identify at least one missing tool using the plurality of video segments;

display an alert about the missing of at least one tool from the tray, wherein the alert comprises at least an image of the missing tool and time corresponding to occurrence of removing of the at least one missing tool from the tray;

receive a user input in response to the alert, wherein the user input may indicate one of continuation and completion of the usage of the plurality of tools; and generate a recommendation to track the at least one missing tool if the user input is received as completion of the usage of the plurality of tools.

8. The system as claimed in claim 7, wherein the processor receives the first data and the second data from a weighing system communicatively coupled with the processor, the first data is a combined weight of the plurality of tools measured before usage of the plurality of tools and upon verifying a user of the plurality of tools, and the second data is combined weight of the plurality of tools measured after at least one tool is removed for usage from the tray or placed back in the tray.

9. The system as claimed in claim 8, wherein the processor is configured to verify the user of the plurality of tools by performing steps of:

receiving an image of the user captured by the at least one image sensor;

determining access to the plurality of tools by the user based on user image and user profile corresponding to the user; and verifying the user as authorized user to access the plurality of tools based on successful determination of access to the plurality of tools.

10. The system as claimed in claim 7, wherein the processor is configured to continue capture of each video segment till length of the current video segment exceeding a maximum threshold time period.

11. The system as claimed in claim 7, wherein the processor is configured to identify the at least one missing tool by performing steps of:

detecting at least one tool available in each video segment of the plurality of tools;

identifying one or more occurrences of removing the at least one tool from the tray in each video segment;

determining a successive occurrence of placing the at least one tool in the tray for each previous occurrence of removing the at least one tool in one of current and subsequent plurality of video segments; and identifying the at least one missing tool in absence of the determination of successive occurrence of placing the tool in the tray in one of the current and subsequent plurality of video segments.

12. The system as claimed in claim 7, wherein the processor is further configured to update the user profile of the user with time stamp details of the usage of each of the plurality of tools, image of the at least one missing tool obtained from the plurality of video segments, the user input received in response to the alert, and the recommendation generated based on the user input.

13. A non-transitory computer readable medium including instructions stored thereon that when processed by at least one processor cause a tray management system to perform acts of:

receiving at least a first data and a second data associated with a plurality of tools placed in a tray, wherein the first data is obtained before usage of the plurality of tools and the second data is obtained after usage of the plurality of tools;

determining a weight discrepancy of the plurality of tools upon receiving the second data, wherein the weight discrepancy is computed as a difference of the first data and the second data;

obtaining a plurality of video segments captured by at least one image sensor, wherein each of the plurality of video segments is captured if the weight discrepancy is determined to be above a threshold and continues till the weight discrepancy is determined to be below the threshold;

identifying at least one missing tool using the plurality of video segments;

display an alert about the missing of at least one tool from the tray, wherein the alert comprises at least an image of the missing tool and time corresponding to occurrence of removing of the at least one missing tool from the tray;

receive a user input in response to the alert, wherein the user input may indicate one of continuation and completion of the usage of the plurality of tools; and generate a recommendation to track the at least one missing tool if the user input is received as completion of the usage of the plurality of tools.

14. The medium as claimed in claim 13, wherein the at least one processor receives the first data and the second data from a weighing system communicatively coupled with the at least one processor, the first data is a combined weight of the plurality of tools measured before usage of the plurality of tools and upon verifying a user of the plurality of tools, and the second data is combined weight of the plurality of tools measured after at least one tool is removed for usage from the tray or placed back in the tray.

15. The medium as claimed in claim 14, wherein the instructions stored thereon further causes the at least one processor to verify the user of the plurality of tools by performing steps of:

receiving an image of the user captured by the at least one image sensor;

determining access to the plurality of tools by the user based on user image and user profile corresponding to the user; and verifying the user as authorized user to access the plurality of tools based on successful determination of access to the plurality of tools.

16. The medium as claimed in claim 13, wherein the instructions stored thereon further causes the at least one processor to continue capture of each video segment length of the current video segment exceeding a maximum threshold time period.

17. The medium as claimed in claim 13, wherein the instructions stored thereon further causes the at least one processor to identify the at least one missing tool by performing steps of:

detecting at least one tool available in each video segment of the plurality of tools;

identifying one or more occurrences of removing the at least one tool from the tray in each video segment;

determining a successive occurrence of placing the at least one tool in the tray for each previous occurrence of removing the at least one tool in one of current and subsequent plurality of video segments; and identifying the at least one missing tool in absence of the determination of successive occurrence of placing the tool in the tray in one of the current and subsequent plurality of video segments.

18. The medium as claimed in claim 13, wherein the instructions stored thereon further causes the at least one processor to update the user profile of the user with time stamp details of the usage of each of the plurality of tools, image of the at least one missing tool obtained from the plurality of video segments, the user input received in response to the alert, and the recommendation generated based on the user input.

* * * * *